(12) United States Patent
Kobayashi et al.

(10) Patent No.: US 11,404,064 B2
(45) Date of Patent: Aug. 2, 2022

(54) INFORMATION PROCESSING APPARATUS AND SPEECH ANALYSIS METHOD

(71) Applicant: KYOCERA Document Solutions Inc., Osaka (JP)

(72) Inventors: Yuki Kobayashi, Osaka (JP); Nami Nishimura, Osaka (JP); Tomoko Mano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 243 days.

(21) Appl. No.: 16/753,453

(22) PCT Filed: Nov. 2, 2018

(86) PCT No.: PCT/JP2018/040837
§ 371 (c)(1),
(2) Date: Apr. 3, 2020

(87) PCT Pub. No.: WO2019/130817
PCT Pub. Date: Jul. 4, 2019

(65) Prior Publication Data
US 2020/0321004 A1 Oct. 8, 2020

(30) Foreign Application Priority Data
Dec. 25, 2017 (JP) .............................. JP2017-248460

(51) Int. Cl.
*G10L 15/26* (2006.01)
*G10L 15/20* (2006.01)
(Continued)

(52) U.S. Cl.
CPC .............. *G10L 15/26* (2013.01); *G10L 15/20* (2013.01); *G10L 21/0272* (2013.01); *G10L 2015/088* (2013.01)

(58) Field of Classification Search
None
See application file for complete search history.

(56) References Cited

U.S. PATENT DOCUMENTS

2011/0125501 A1* 5/2011 Holtel ................ G10L 15/22
704/E15.001
2011/0264444 A1* 10/2011 Morisaki ............ G10L 15/26
704/E11.001
(Continued)

FOREIGN PATENT DOCUMENTS

| JP | 2006-251898 A | 9/2006 |
|----|---------------|--------|
| JP | 2008-009552 A | 1/2008 |
| JP | 2016-162339 A | 9/2016 |

*Primary Examiner* — Stella L. Woo
(74) *Attorney, Agent, or Firm* — IP Business Solutions, LLC

(57) ABSTRACT

An information processing apparatus includes a first detector, a textualization device, a second detector, a display device and a display controller. The first detector detects, from audio data in which speech of each person in a group composed of a plurality of persons has been recorded, each utterance made during the speech. The textualization device converts contents of each utterance detected by the first detector into text. The second detector detects predetermined keywords included in each utterance on the basis of text data obtained through textualization by the textualization device. The display controller causes the display device to display the predetermined keywords detected by the second detector.

9 Claims, 22 Drawing Sheets

(51) Int. Cl.
*G10L 21/0272* (2013.01)
*G10L 15/08* (2006.01)

(56) References Cited

U.S. PATENT DOCUMENTS

2015/0019569 A1* 1/2015 Parker .................. G06F 16/338
707/748
2016/0299955 A1* 10/2016 Jain ....................... G06F 16/313
2020/0013389 A1* 1/2020 Ukai ..................... G06F 40/268

* cited by examiner

Fig.5

KEYWORDS APPEARING IN RESPECTIVE GROUPS — 115

| G1 | | G2 | | G3 | |
|---|---|---|---|---|---|
| WATER VAPOR | 15 | WATER VAPOR | 13 | WATER VAPOR | 18 |
| ATMOSPHERIC PRESSURE | 13 | ATMOSPHERIC PRESSURE | 11 | ATMOSPHERIC PRESSURE | 21 |
| CHANGE | 0 | CHANGE | 12 | CHANGE | 0 |
| MELTING | 11 | MELTING | 0 | MELTING | 11 |

Fig.9

KEYWORDS HAVING APPEARANCE COUNTS EQUAL TO OR
GREATER THAN THRESHOLD VALUE IN EACH GROUP

| G1 | | G2 | | G3 | |
|---|---|---|---|---|---|
| WATER VAPOR | 15 | WATER VAPOR | 13 | WATER VAPOR | 18 |
| ATMOSPHERIC PRESSURE | 13 | CHANGE | 12 | ATMOSPHERIC PRESSURE | 21 |

|  | TOTAL RESULT | | |
|---|---|---|---|
|  | G1 | G2 | G3 |
| WATER VAPOR | 30 | 26 | 36 |
| ATMOSPHERIC PRESSURE | 39 | 33 | 63 |
| CHANGE | 0 | 12 | 0 |
| MELTING | 55 | 0 | 55 |
| TOTAL | 124 | 71 | 154 |

TOTAL RESULT

G1

| WEATHER | | SPORTS | | SOCIETY | |
|---|---|---|---|---|---|
| CLEAR | 8 | TENNIS | 70 | ECONOMY | 35 |
| CLOUDY | 7 | BASEBALL | 3 | ENTERPRISE | 28 |
| RAIN | 6 | SOCCER | 20 | STOCK PRICE | 72 |
| CLOUD | 10 | SUSPEND | 7 | BUSINESS CONDITIONS | 5 |
| BRIGHT | 1 | FINAL | 18 | SALES | 38 |
| SMOKE | 2 | OUTCOME | 9 | PROFIT AND LOSS | 45 |
| TOTAL | 34 | | 127 | | 223 |

G2

| WEATHER | | SPORTS | | SOCIETY | |
|---|---|---|---|---|---|
| CLEAR | 34 | TENNIS | 69 | ECONOMY | 7 |
| CLOUDY | 27 | BASEBALL | 2 | ENTERPRISE | 6 |
| RAIN | 71 | SOCCER | 19 | STOCK PRICE | 5 |
| CLOUD | 4 | SUSPEND | 6 | BUSINESS CONDITIONS | 9 |
| BRIGHT | 37 | FINAL | 1 | SALES | 0 |
| SMOKE | 44 | OUTCOME | 9 | PROFIT AND LOSS | 1 |
| TOTAL | 217 | | 121 | | 28 |

G3

| WEATHER | | SPORTS | | SOCIETY | |
|---|---|---|---|---|---|
| CLEAR | 40 | TENNIS | 67 | ECONOMY | 6 |
| CLOUDY | 33 | BASEBALL | 0 | ENTERPRISE | 5 |
| RAIN | 75 | SOCCER | 17 | STOCK PRICE | 4 |
| CLOUD | 10 | SUSPEND | 4 | BUSINESS CONDITIONS | 8 |
| BRIGHT | 43 | FINAL | 15 | SALES | 1 |
| SMOKE | 50 | OUTCOME | 6 | PROFIT AND LOSS | 0 |
| TOTAL | 253 | | 109 | | 24 |

| KEYWORDS HAVING APPEARANCE COUNTS EQUAL TO OR GREATER THAN THRESHOLD VALUE | | |
|---|---|---|
| G1<br>SOCIETY | G2<br>WEATHER | G3<br>WEATHER |
| ECONOMY 35 | CLEAR 34 | CLEAR 40 |
| ENTERPRISE 28 | CLOUDY 27 | CLOUDY 33 |
| STOCK PRICE 72 | RAIN 71 | RAIN 75 |
| BUSINESS 5<br>CONDITIONS | CLOUD 4 | CLOUD 10 |
| SALES 38 | BRIGHT 37 | BRIGHT 43 |
| PROFIT AND 45<br>LOSS | SMOKE 44 | SMOKE 50 |
| TOTAL 223 | TOTAL 217 | TOTAL 253 |

Fig.16

KEYWORDS APPEARING AND WORDS FREQUENTLY APPEARING IN EACH GROUP

G1

| KEYWORD | | WORD (15 OR MORE APPEARANCE COUNTS) | |
|---|---|---|---|
| WATER VAPOR | 15 | RAIN | 15 |
| ATMOSPHERIC PRESSURE | 13 | EVAPORATION | 23 |
| CHANGE | 0 | | |
| MELTING | 11 | | |

G2

| KEYWORD | | WORD (15 OR MORE APPEARANCE COUNTS) | |
|---|---|---|---|
| WATER VAPOR | 13 | RAIN | 35 |
| ATMOSPHERIC PRESSURE | 11 | EVAPORATION | 20 |
| CHANGE | 12 | VAPORIZATION | 18 |
| MELTING | 0 | | |

G3

| KEYWORD | | WORD (15 OR MORE APPEARANCE COUNTS) | |
|---|---|---|---|
| WATER VAPOR | 18 | RAIN | 23 |
| ATMOSPHERIC PRESSURE | 21 | EVAPORATION | 18 |
| CHANGE | 0 | VAPORIZATION | 52 |
| MELTING | 11 | | |

Fig.17

KEYWORDS APPEARING AND WORDS FREQUENTLY APPEARING IN EACH GROUP

G1

| KEYWORD | | WORD (15 OR MORE APPEARANCE COUNTS) | |
|---|---|---|---|
| WATER VAPOR | 15 | RAIN | 15 |
| ATMOSPHERIC PRESSURE | 13 | EVAPORATION | 23 |
| CHANGE | 0 | | |
| MELTING | 11 | | |

G2

| KEYWORD | | WORD (15 OR MORE APPEARANCE COUNTS) | |
|---|---|---|---|
| WATER VAPOR | 13 | RAIN | 35 |
| ATMOSPHERIC PRESSURE | 11 | EVAPORATION | 20 |
| CHANGE | 12 | VAPORIZATION | 18 |
| MELTING | 0 | | |

G3

| KEYWORD | | WORD (15 OR MORE APPEARANCE COUNTS) | |
|---|---|---|---|
| WATER VAPOR | 18 | RAIN | 23 |
| ATMOSPHERIC PRESSURE | 21 | EVAPORATION | 18 |
| CHANGE | 0 | VAPORIZATION | 52 |
| MELTING | 11 | | |

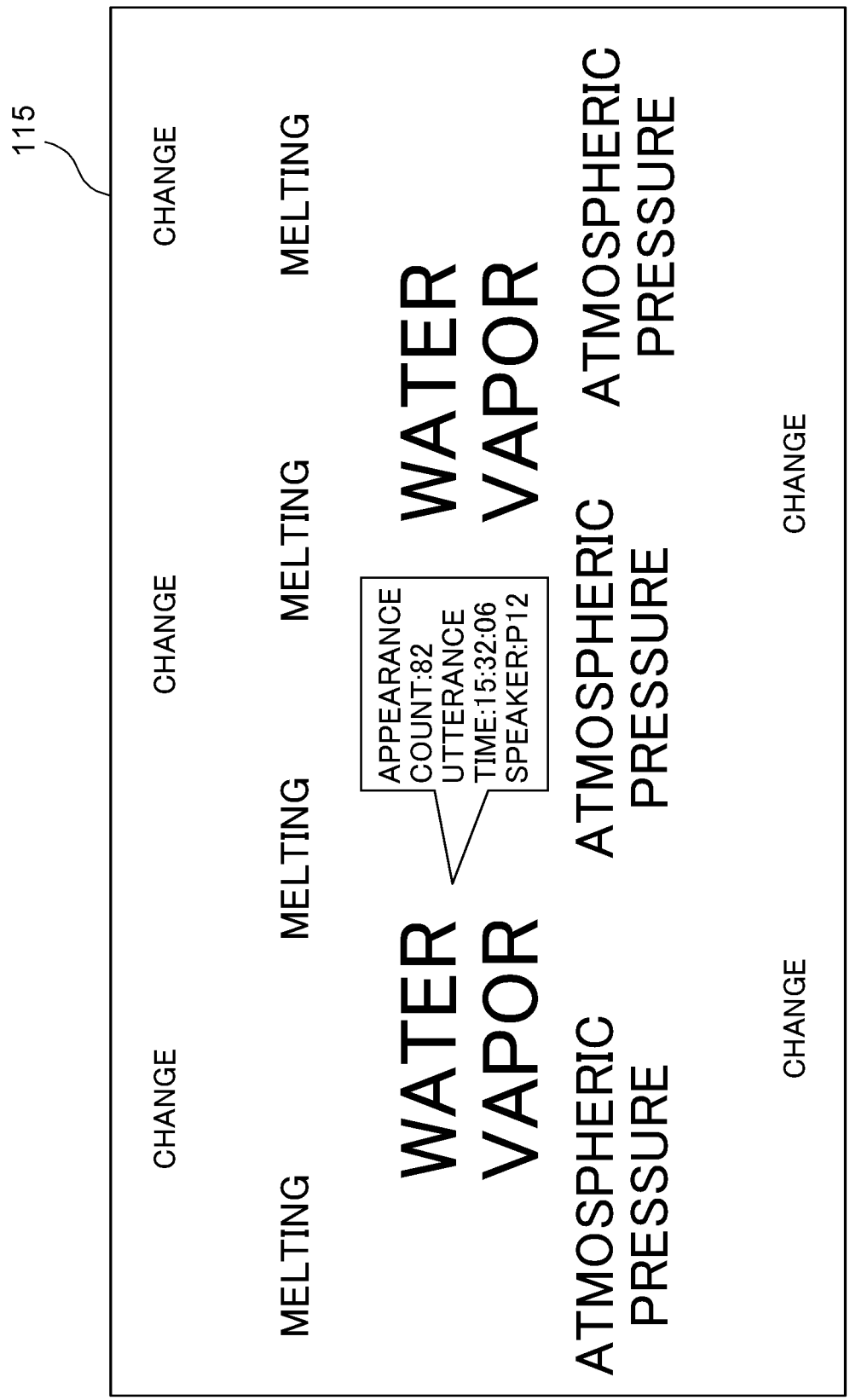

INFORMATION PROCESSING APPARATUS AND SPEECH ANALYSIS METHOD

TECHNICAL FIELD

The present invention relates to an information processing apparatus and a speech analysis method, and particularly, to a technology for analyzing the contents of the speech of a person.

BACKGROUND ART

Recently, a technology for determining simulation of debate in respective groups and clarifying the situation thereof has been proposed (refer to Patent Literature 1 below). In this technology, times of speaking and speaking time duration of the speech of respective members of a group are stored, the times of speaking and speaking time duration of the respective members are divided in time series for each group, a ratio of the speaking time duration of each member to the speaking time duration of all members of each group is calculated, and a graph showing speech density contribution ratios of the respective members is generated for each group.

CITATION LIST

Patent Literature

Patent Literature 1

Japanese Unexamined Patent Application Publication No. 2016-162339

SUMMARY OF INVENTION

However, the aforementioned technology merely indicates degrees of contribution of respective members in a group on the basis of speaking times of the respective members and does not realize display of the contents of speech in a debate conducted by the group.

An object of the present invention devised in view of the aforementioned circumstances is to display the contents of speech given in a group in a conference or the like.

An information processing apparatus according to one aspect of the present invention includes: a first detector that detects, from audio data in which speech of each person in a group composed of a plurality of persons has been recorded, each utterance made during the speech; a textualization device that converts contents of each utterance detected by the first detector into text; a second detector that detects a predetermined keyword included in each utterance on the basis of text data obtained through textualization by the textualization device; a display device; and a display controller that causes the display device to display the predetermined keyword detected by the second detector.

In addition, a speech analysis method according to another aspect of the present invention includes: an utterance detection step of detecting, from audio data in which speech of each person in a group composed of a plurality of persons has been recorded, each utterance made during the speech; a textualization step of converting contents of each utterance detected in the utterance detection step into text; a keyword detection step of detecting a predetermined keyword included in each utterance on the basis of text data obtained through textualization in the textualization step; and a display control step of causing a display device to display the predetermined keyword detected in the keyword detection step.

An information processing apparatus according to another aspect of the present invention includes: a display device; an audio input device to which electronic signals representing speech are input; a storage device that stores audio data based on the input electronic signals for each person who has produced speech when the electronic signals are input to the audio input device; and a control device that includes a processor and functions as, by the processor executing an evaluation program: a first detector that extracts a part corresponding to an utterance from the audio data and detects the extracted part as an utterance; a textualization device that converts contents of the utterance detected by the first detector into text; a second detector that detects a predetermined keyword included in the utterance on the basis of text data obtained through textualization by the textualization device; and a display controller that causes the display device to display the predetermined keyword detected by the second detector.

According to the present invention, it is possible to display the contents of utterances given in a conference or the like in a group.

BRIEF DESCRIPTION OF DRAWINGS

FIG. 5 is a diagram showing an example of a display screen of a display device.

FIG. 9 is a diagram showing an example of a display screen of the display device.

FIG. 11B is a diagram showing an example of a display screen of the display device.

FIG. 13 is a diagram showing an example of types, keywords belonging to types, and detection counts.

FIG. 14 is a diagram showing an example of a display screen of the display device.

FIG. 16 is a diagram showing an example of a display screen of the display device.

FIG. 17 is a diagram showing an example of a display screen of the display device.

FIG. 21 is a diagram showing an example of a display screen of the display device.

DESCRIPTION OF EMBODIMENTS

Figure 1:
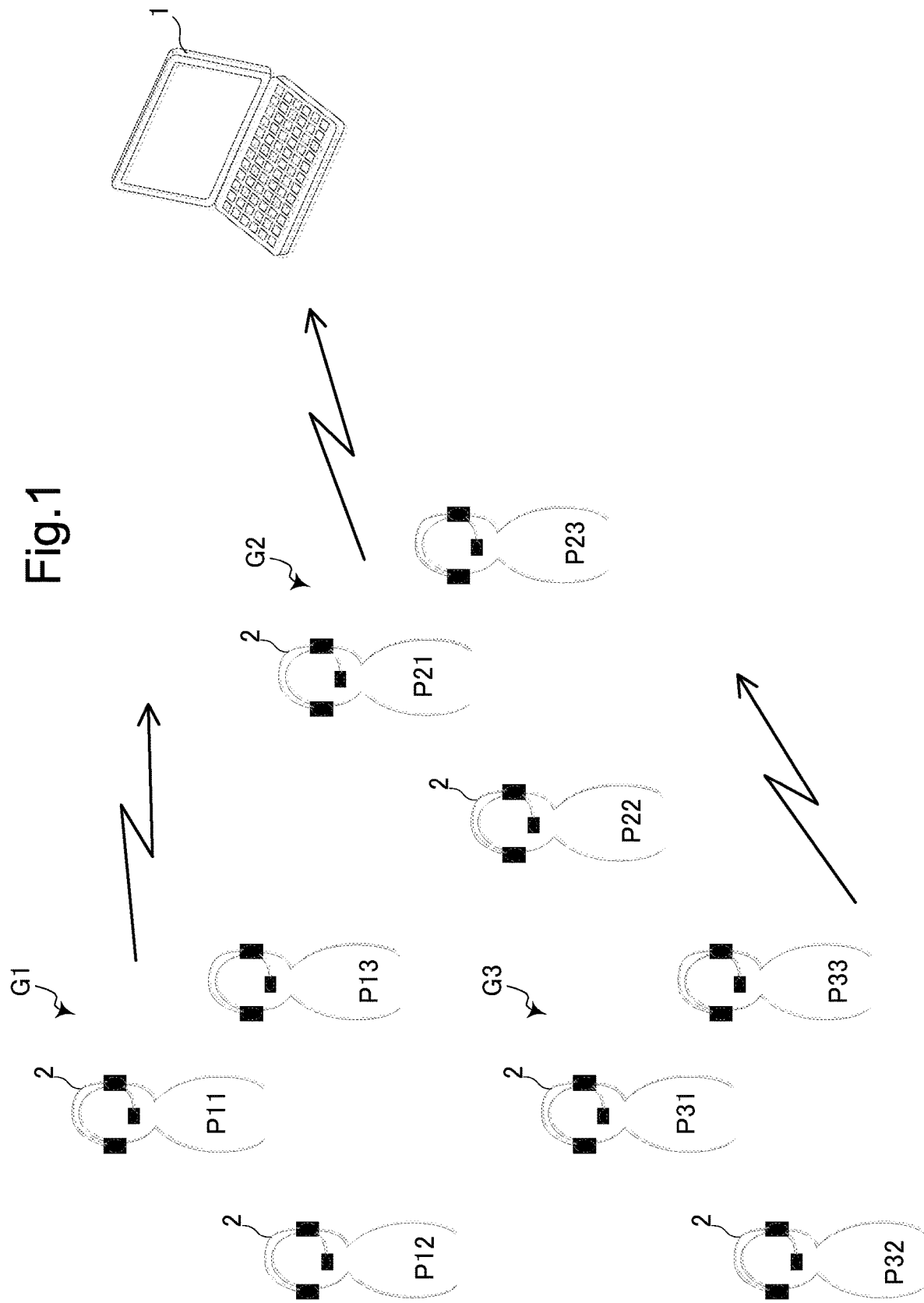
FIG. 1 is a diagram showing an information processing apparatus according to a first embodiment of the present invention and subjects whose speech is analyzed by the information processing apparatus.

Hereinafter, an information processing apparatus, a speech analysis method, and a speech analysis program according to one embodiment of the present invention will be described with reference to the drawings. FIG. 1 is a diagram showing an information processing apparatus according to a first embodiment of the present invention and subjects whose speech is analyzed by the information processing apparatus.

The information processing apparatus 1 acquires, as audio data, speech produced by respective persons belonging to a plurality of conversation groups G1 to G3 composed of a plurality of predetermined persons. For example, it may be assumed that a plurality of persons including persons P11, P12 and P13 belonging to the group G1, persons P21, P22 and P23 belonging to the group G2 and persons P31, P32 and P33 belonging to the group G3 (a total of nine persons including respective persons belonging to three groups is described in the present embodiment but the number of persons is not limited thereto) conduct a meeting, a debate, a class, a conference or the like (hereinafter collectively referred to as a "conference") in units of group.

Respective persons of a corresponding conversation group speak in a state in which they use headsets 2 having a microphone function. That is, the respective headsets 2 used by the respective persons acquire speech of conversation of the persons wearing the headsets 2, convert the speech into electronic signals representing the speech and output the electronic signals to the information processing apparatus 1. The information processing apparatus 1 and the respective headsets 2 are connected through, for example, wired communication according to cable connection or wireless communication such as Bluetooth (registered trademark) or wireless LAN. The information processing apparatus 1 converts the electronic signals representing the speech output from the respective headsets 2 into audio data composed of digital audio signals and respectively accumulates audio data with respect to the respective headsets 2, that is, the aforementioned nine persons P11 to P33.

Figure 2:
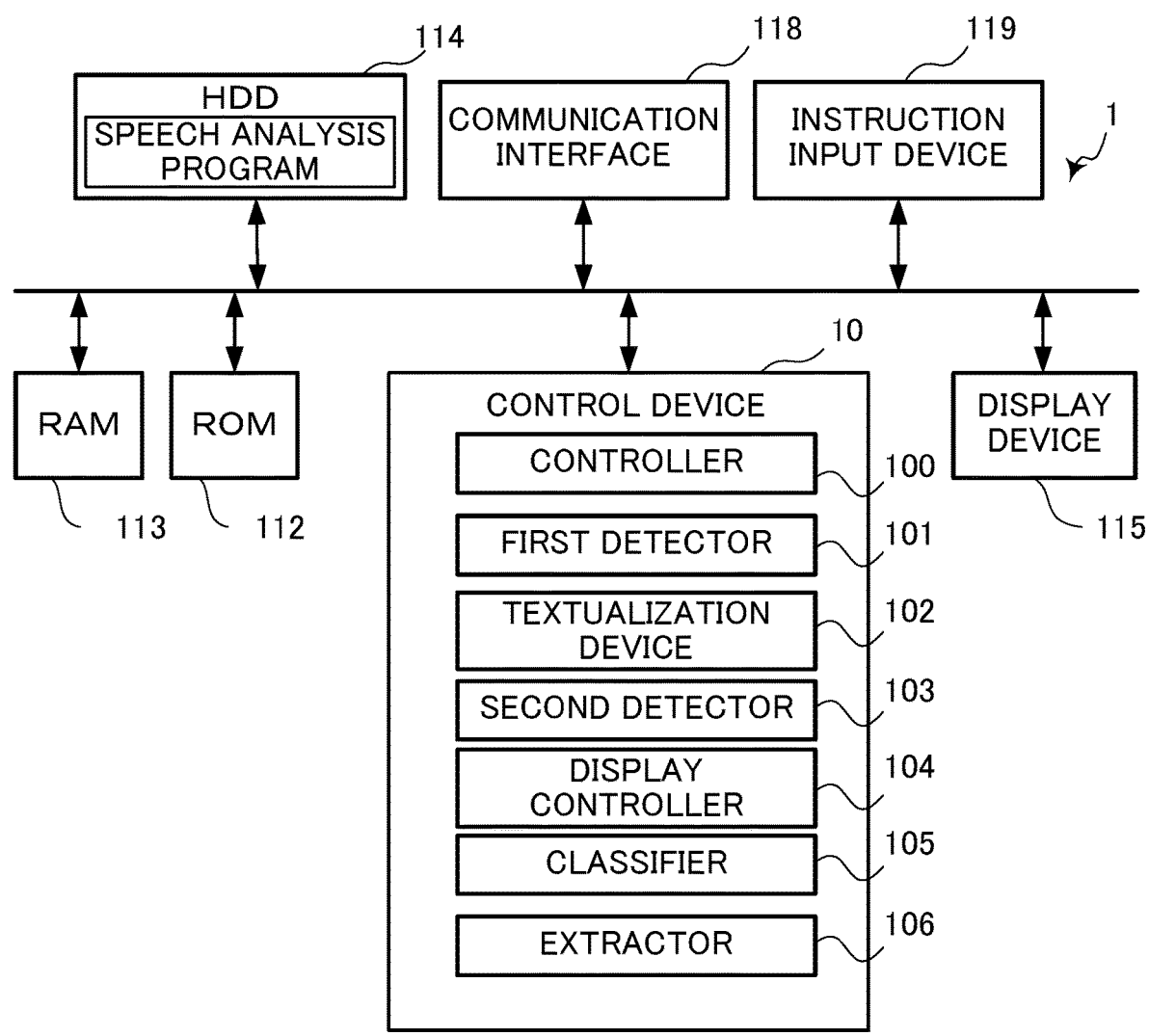
FIG. 2 is a block diagram schematically showing internal components of the information processing apparatus.

Next, a configuration of the information processing apparatus 1 according to the first embodiment will be described. FIG. 2 is a block diagram schematically showing internal components of the information processing apparatus 1.

The information processing apparatus 1 may be a computer, for example. The information processing apparatus 1 includes a control device 10, a read only memory (ROM) 112, a random access memory (RAM) 113, a hard disk drive (HDD) 114, a display device 115, a communication interface 118, and an instruction input device 119. These components may transmit/receive data or signals through a central processing unit (CPU) bus.

The control device 10 controls the overall operation of the information processing apparatus 1. The ROM 112 stores an operation program with respect to basic operations of the information processing apparatus 1. The RAM 113 is used as an operation region or the like of the control device 10.

The HDD 114 stores a speech analysis program according to the first embodiment of the present invention in a part of a storage region thereof. In addition, the HDD 114 stores the audio data with respect to the nine persons P11 to P33. Meanwhile, the HDD 114 is an example of a storage device in the claims. However, a nonvolatile ROM (e.g., included in the control device 10) included in the information processing apparatus 1 may function as the storage device.

Identification information for identifying each headset 2 is attached in advance to each headset 2 connected to the information processing apparatus 1. Although the identification information is not particularly limited as long as it can identify the headset 2, an identification number may be used, for example. The HDD 114 stores the identification information for each headset 2 in advance. In addition, the HDD 114 stores respective pieces of identification information in association with group information for identifying a group according to an instruction input by a user through the instruction input device 119.

In the present embodiment, the HDD 114 stores identification information of the headsets 2 used by the persons P11, P12, and P23 in association with group information identifying the group G1. In addition, the HDD 114 stores identification information of the headsets 2 used by the persons P21, P22 and P23 in association with group information identifying the group G2. Furthermore, the HDD 114 stores identification information of the headsets 2 used by the persons P31, P32 and P33 in association with group information identifying the group G3.

The display device 115 includes a liquid crystal display (LCD) or the like and displays an operation guide and the like for an operator who operates the information processing apparatus 1.

The communication interface 118 includes a USB interface, a wireless LAN interface or the like. The communication interface 118 functions as an interface for performing data communication with each headset 2. The communication interface 118 is an example of an audio input device in the claims.

The instruction input device 119 includes a keyboard, a mouse or the like, and an operation instruction is input thereto by an operator.

The control device 10 includes a processor, a RAM, a ROM and the like. The processor is a CPU, a microprocessing unit (MPU), an application specific integrated circuit (ASIC) or the like. The control device 10 functions as a controller 100, a first detector 101, a textualization device 102, a second detector 103, a display controller 104, a classifier 105, and an extractor 106 by the processor executing the speech analysis program stored in the HDD 114. Meanwhile, the controller 100, the first detector 101, the textualization device 102, the second detector 103, the display controller 104, the classifier 105, and the extractor 106 may be configured as hardware circuits.

The control device 100 has a function of controlling the overall operation of the information processing apparatus 1.

Figure 3:
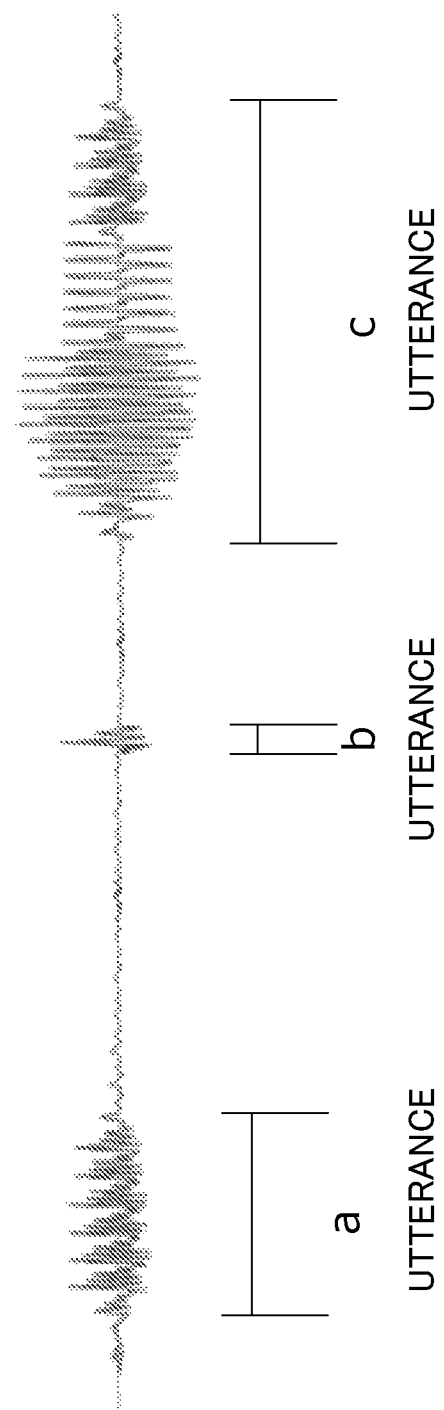
FIG. 3 is a diagram showing an example of audio data.

The first detector (utterance detector) 101 detects, from the audio data with respect to the nine persons P11 to P33 stored in the HDD 114, utterances in speech recorded in the audio data. FIG. 3 is a diagram showing an example of audio data. The vertical axis of FIG. 3 represents an amplitude of sound (in units of dB) and the horizontal axis represents time. The first detector 101 analyzes audio data and detects, as an utterance, a part in which an amplitude (e.g., 20 dB)

equal to or greater than a predetermined level continues for a predetermined prescribed time (e.g., 0.25 seconds) or longer from among amplitudes indicated by the audio data. In the audio data shown in FIG. 3, the first detector 101 detects parts a, b and c as utterances.

The textualization device 102 includes a known speech recognition function and converts the contents of utterances of the respective persons included in the audio data into text through character conversion according to the speech recognition function.

The second detector (keyword detector) 103 detects predetermined keywords included in each utterance on the basis of text data obtained through textualization by the textualization device 102.

The display controller 104 causes the display device 115 to display the predetermined keywords detected by the second detector 103. In addition, the display controller 104 causes the display device 115 to display a keyword having a detection count equal to or greater than a predetermined first value from among the predetermined keywords detected by the second detector 103.

The classifier (type classifier) 105 classifies the predetermined keywords detected by the second detector 103 into predetermined types. The display controller 104 causes the display device 115 to display a type for which the sum of detection counts of keywords belonging thereto is equal to or greater than a predetermined second value and keywords belonging to the type.

The extractor (word extractor) 106 extracts words other than the predetermined keywords from text data converted by the textualization device 102. The display controller 104 causes the display device 115 to display a word having a detection count equal to or greater than a predetermined third value from among the words extracted by the extractor 106.

Figure 4:
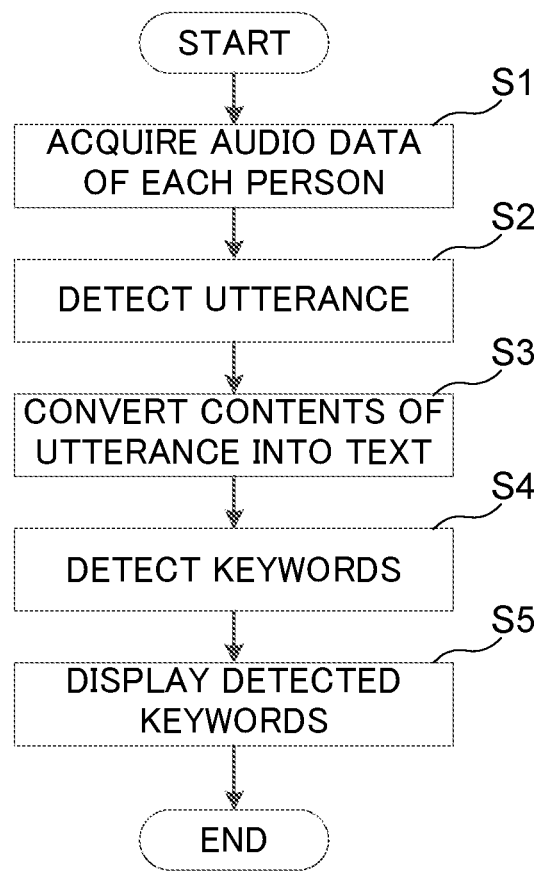
FIG. 4 is a flowchart showing speech analysis processing performed by the information processing apparatus according to the first embodiment.

Next, speech analysis processing performed by the information processing apparatus 1 according to the first embodiment will be described. FIG. 4 is a flowchart showing the speech analysis processing performed by the information processing apparatus 1 according to the first embodiment.

A situation in which the speech analysis is performed is a situation in which the respective persons belonging to the conversation groups G1 to G3 conduct conferences in the respective groups. The persons P11 to P33 respectively wear the headsets 2 and the respective headsets 2 are connected such that they can communicate with the information processing apparatus 1, as described above. In this state, the persons P11 to P33 deliver speech during conferences in the respective groups to which they belong. Voices of speech of the persons P11 to P33 are collected by the respective headsets 2 of the persons P11 to P33 and output to the information processing apparatus 1.

The information processing apparatus 1 acquires audio data from the respective headsets 2 through the communication interface 118 (step S1). That is, when the communication interface 118 receives electronic signals representing speech output from the respective headsets 2, the first detector 101 converts the electronic signals representing the acquired speech into audio data composed of digital audio signals and stores the audio data in the HDD 114. The first detector 101 stores the audio data in the HDD 114 for the respective persons P11 to P33 in association with identification information stored in the HDD 114.

Subsequently, the first detector 101 detects utterances made during speech represented by the audio data from the audio data stored in the HDD 114 for the respective persons P11 to P33, as described above (step S2).

Then, the textualization device 102 converts the contents of utterances of the respective persons included in the audio data into text through character conversion using a speech recognition function (step S3). The first detector 101 stores time periods corresponding to the respective utterances of the persons P11 to P33 in the audio data in the HDD 114 and the textualization device 102 recognizes the time period parts in the audio data as utterances and converts the contents of the utterances into text through character conversion.

Subsequently, the second detector 103 detects predetermined keywords included in the respective utterances on the basis of text data obtained through textualization by the textualization device 102 as described above (step S4). For example, when "water vapor," "atmospheric pressure," "change" and "melting" are stored in the HDD 114 as predetermined keywords, the second detector 103 determines whether the keywords are included in the text data obtained by converting the aforementioned utterances into text. The second detector 103 detects the keywords and increments appearance counts of the keywords if the keywords are included in the text data. The second detector 103 stores the appearance counts of the respective keywords in association with identification information in the HDD 114.

Then, the display controller 104 causes the display device 115 to display the keywords detected by the second detector 103 (step S5). When the predetermined keywords are the keywords represented in the above-described example, the display controller 104 sums the appearance counts of the keywords for each group on the basis of the identification information and group information stored in the HDD 114 and causes the display device 115 to display an image representing the keywords and the appearance counts of the keywords for the respective groups of the persons P11 to P33, as shown in FIG. 5. Meanwhile, the display controller 104 may cause the display device 115 to display a keyword that is not detected by the second detector 103 (a keyword having a detection count of "0") as detection count "0," as shown in FIG. 5.

Figure 6:
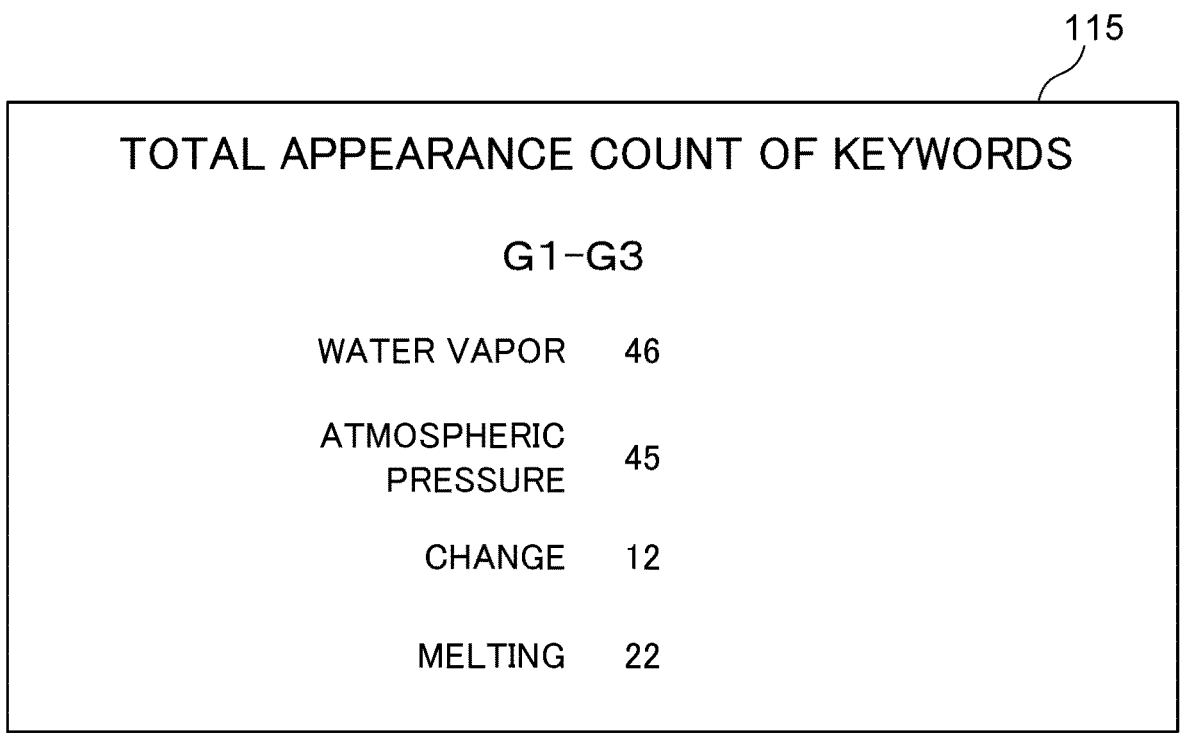
FIG. 6 is a diagram showing an example of a display screen of the display device.
Figure 7:
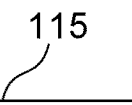
FIG. 7 is a diagram showing an example of a display screen of the display device.

In addition, the display controller 104 causes the display device 115 to display an image representing the keywords and the appearance counts of the keywords in all groups according to a screen switching instruction input from an operator by operating the instruction input device 119, as shown in FIG. 6. Alternatively, the display controller 104 causes the display device 115 to display an image in which keywords having the top three appearance counts are arranged in descending order of appearance count in all groups according to the screen switching instruction input from the operator by operating the instruction input device 119, as shown in FIG. 7.

Figure 8:
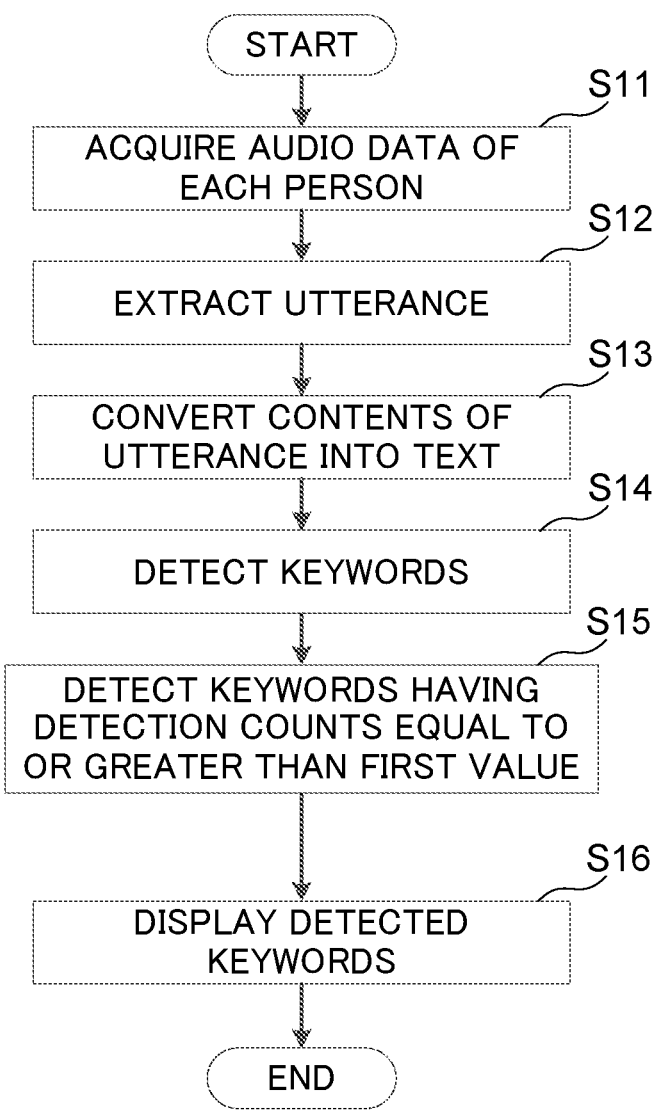
FIG. 8 is a flowchart showing speech analysis processing performed by the information processing apparatus according to a second embodiment.

FIG. 8 is a diagram showing speech analysis processing performed by the information processing apparatus 1 according to a second embodiment. As shown in FIG. 8, after processing until keyword detection like steps S1 to S4 in the first embodiment ends (steps S11 to S14), the display controller 104 detects keywords having detection counts equal to or greater than the predetermined first value from among the keywords detected by the second detector 103 (step S15) and causes the display device 115 to display the detected keywords along with the detection counts thereof (step S16) in the second embodiment.

For example, when the first value is "12," the display controller 104 may detect keywords having detection counts equal to or greater than the first value and cause the display device 115 to display only the detected keywords and the detection counts thereof for the respective groups as shown in FIG. 9.

According to the first and second embodiments, it is possible to display the contents of utterances given in a conference or the like in a group such that a user can visually recognize the contents. Accordingly, the user can visually recognize the display and correctly ascertain the contents of utterances of persons participating in the conference.

Figure 10:
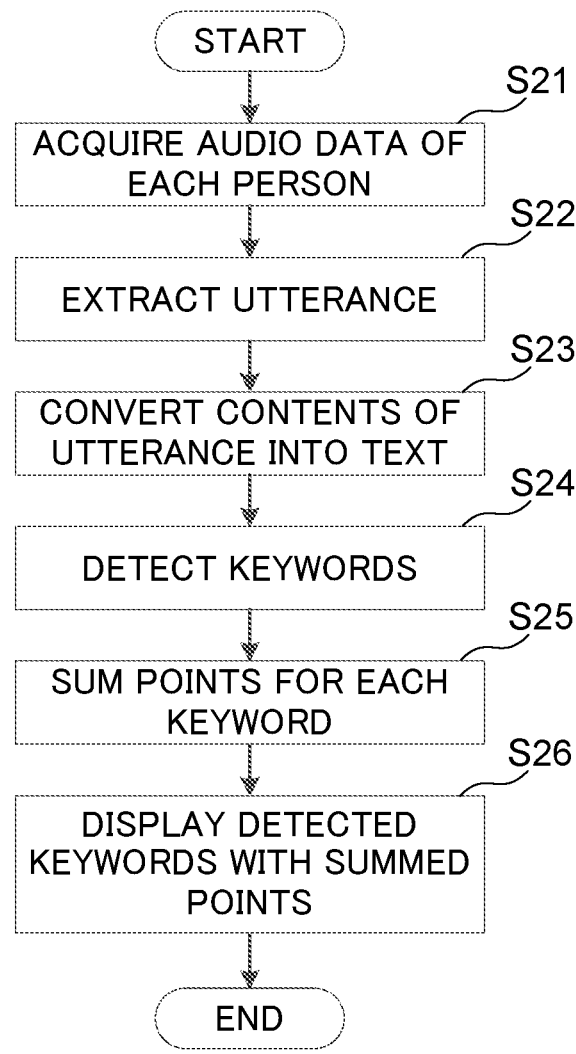
FIG. 10 is a flowchart showing speech analysis processing performed by the information processing apparatus according to a third embodiment.

FIG. 10 is a diagram showing speech analysis processing performed by the information processing apparatus 1 according to a third embodiment. As shown in FIG. 10, after processing until keyword detection like steps S1 to S4 in the first embodiment ends (steps S21 to S24), the display controller 104 sums points given to the respective keywords in advance for the keywords according to detection counts of the keywords (step S25) and causes the display device 115 to display the keywords along with the summed points (step S26) in the third embodiment. Furthermore, the display controller 104 may calculate and display the sums of points of all keywords for the groups G1 to G3. Meanwhile, a plurality of predetermined keywords are provided in the third embodiment.

The HDD 114 stores predetermined points added each detection time with respect to each keyword. The points are set in advance by a host or the like of a conference depending on an importance or the like in the conference and stored in the HDD 114 according to operation of the instruction input device 119, for example. The display controller 104 adds the points given to each keyword whenever the keyword is detected once. Accordingly, the summed total points for a keyword detected many times is high.

Figure 11A:
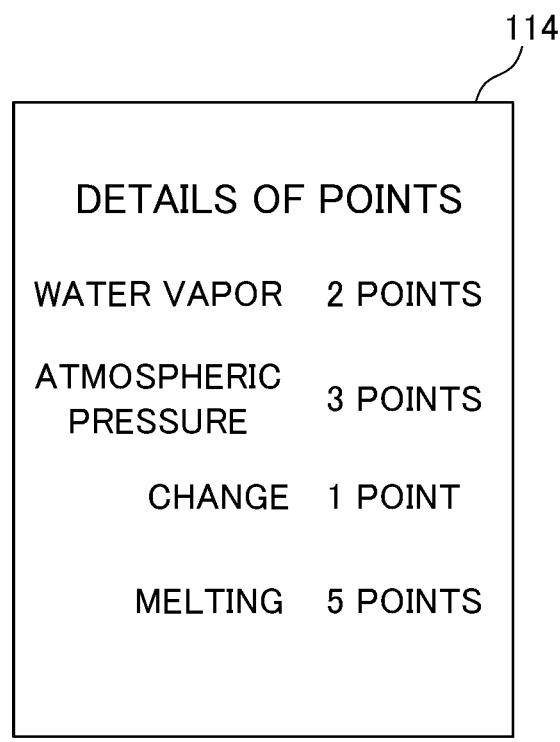
FIG. 11A is a diagram showing an example of points.

For example, when the HDD 114 stores 2 points for "water vapor," 3 points for "atmospheric pressure," 1 point for "change" and 5 points for "melting" as points set for the respective keywords, as shown in FIG. 11A, the display controller 104 sums points for the keywords according to the numbers of times of detection of the keywords. Further, the display controller 104 causes the display device 115 to display summed points, respective keywords and the sums of points of all keywords for the groups G1 to G3 by calculating the sums of points of all keywords for the groups G1 to G3 and causing the display device 115 to display a display screen such as "total result" shown in FIG. 11B.

According to the third embodiment, a user can ascertain a degree to which important keywords are used in a conference by visually recognizing displayed keywords and total points and acquire an index for determining which group has conducted a most significant conference by visually recognizing the sum of points of all keywords.

Figure 12:
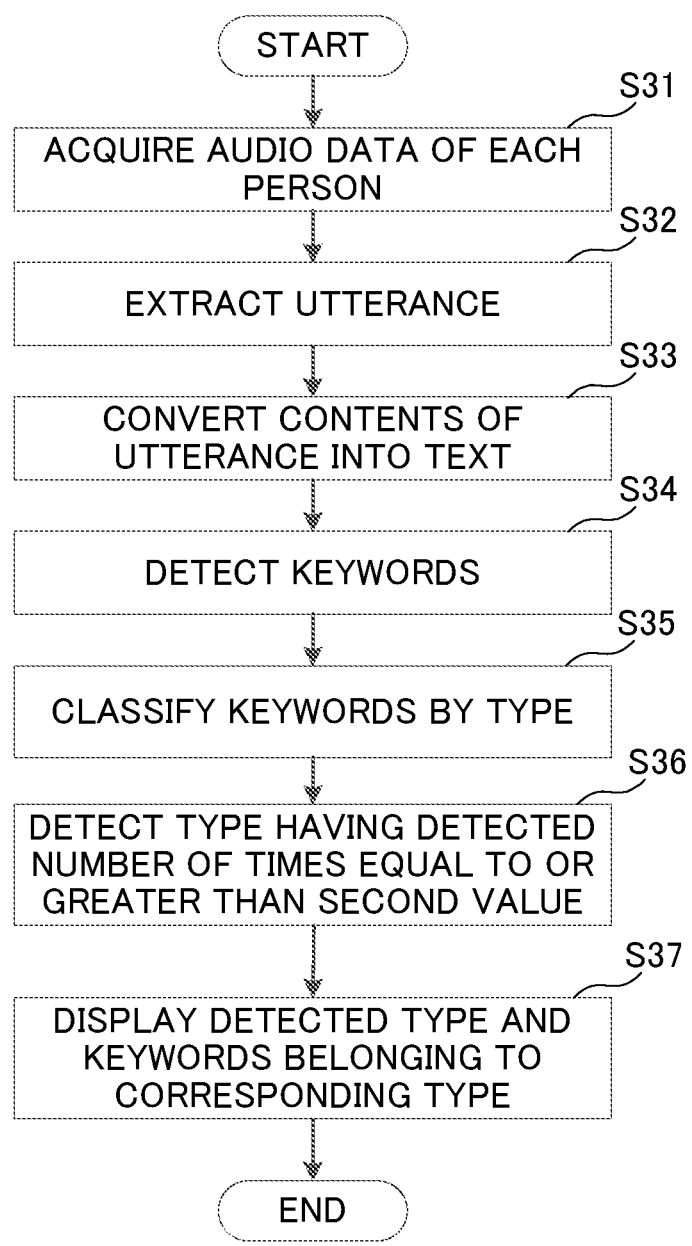
FIG. 12 is a flowchart showing speech analysis processing performed by the information processing apparatus according to a fourth embodiment.

Next, speech analysis processing performed by the information processing apparatus 1 according to a fourth embodiment will be described. FIG. 12 is a flowchart showing the speech analysis processing performed by the information processing apparatus 1 according to the fourth embodiment.

In the fourth embodiment, after processing until keyword detection like steps S1 to S4 in the first embodiment ends (steps S31 to S34), the classifier 105 classifies the keywords detected by the second detector 103 into predetermined types (step S35). For example, the HDD 114 may store "weather," "sports" and "society" as predetermined types. Further, the HDD 114 stores keywords such as "clear," "cloudy," "rain," "cloud," "bright" and "smoke" in advance as keywords belonging to the type "weather." In addition, the HDD 114 stores keywords such as "tennis," "baseball," "soccer," "suspend," "final" and "outcome" in advance as keywords belonging to the type "sports." Furthermore, the HDD 114 stores keywords such as "economy," "enterprise," "stock price," "business conditions, "sales" and "profit and loss" in advance as keywords belonging to the type "society."

In this case, the second detector 103 first detects "clear," "cloudy," "rain," "cloud," "bright," "smoke," "tennis," "baseball," "soccer," "suspend," "final," "outcome," "enterprise," "stock price," "business conditions," "sales" and "profit and loss" from utterances of the respective persons. Then, the classifier 105 determines whether the detected keywords belong to any of the types "weather," "sports" and "society" and classifies the detected keywords into the respective types. FIG. 13 shows an example of types, keywords belonging to the types and detection counts. The classifier 105 classifies appearing keywords into the respective types, counts a detection count of each keyword belonging to each type and stores the detection count along with the keyword in the HDD 114.

Subsequently, the display controller 104 detects a type having a detection count equal to or greater than a predetermined second value (step S36). That is, the display controller 104 detects a type for which the sum of detection counts of respective keywords belonging to the type is equal to or greater than the second value. For example, in the case of the second value that is "150" and the types, keywords belonging to the types and detection counts shown in FIG. 13, the display controller 104 detects the type "society" with respect to the group G1, for example.

Then, the display controller 104 causes the display device 115 to display the detected type along with detection counts of respective keywords belonging to the type (step S37). When the type "society" is detected with respect to the group G1, the type "weather" is detected with respect to the group G2 and the type "weather" is detected with respect to the group G3, as described above, the display controller 104 causes the display device 115 to display the detected types, the keywords belonging to the types and detection counts of the keywords, as shown in the example of FIG. 14.

According to the fourth embodiment, since detected keywords are classified into types and a type for which the sum of detection counts of keywords belonging thereto is equal to or greater than the second value is displayed, a user can clearly ascertain a type in which predetermined keywords appear many times.

Figure 15:
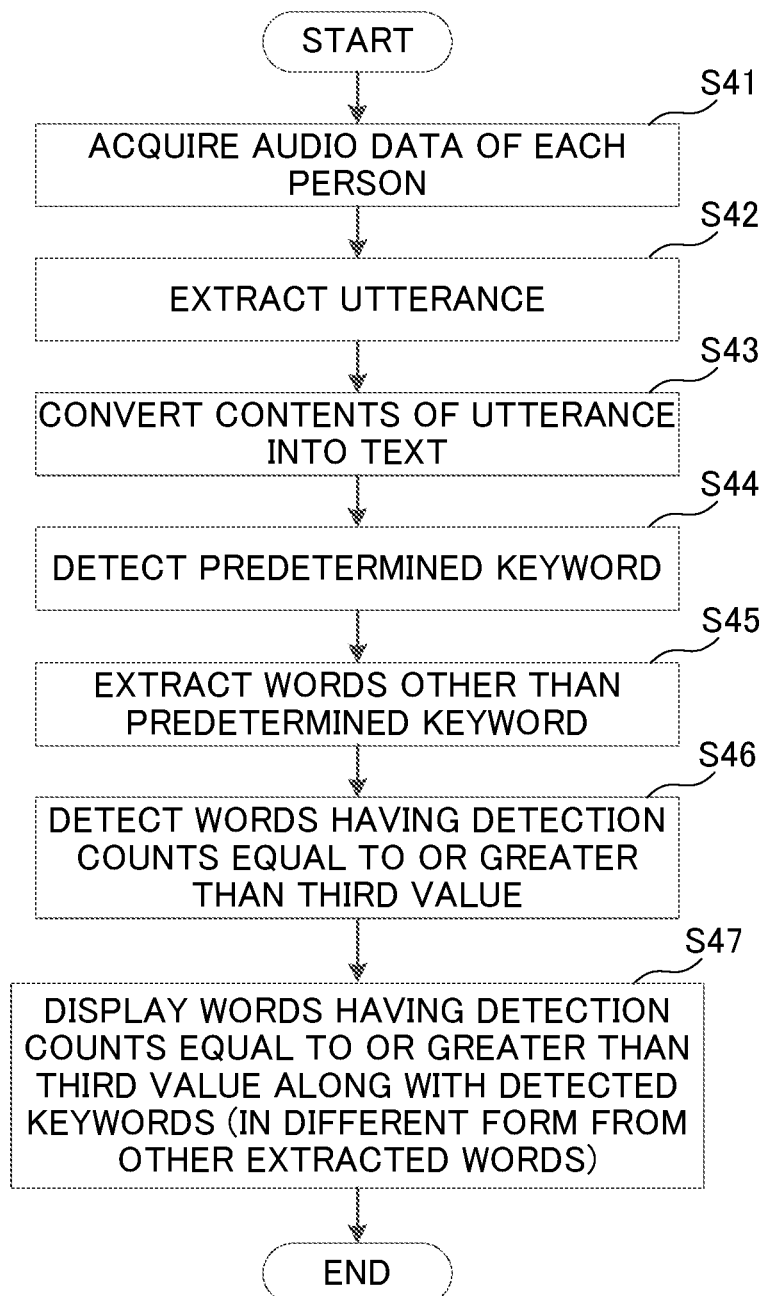
FIG. 15 is a flowchart showing speech analysis processing performed by the information processing apparatus according to a fifth embodiment.

Next, speech analysis processing performed by the information processing apparatus 1 according to a fifth embodiment will be described. FIG. 15 is a flowchart showing the speech analysis processing performed by the information processing apparatus 1 according to the fifth embodiment.

In the fifth embodiment, after processing until keyword detection like steps S1 to S4 in the first embodiment ends (steps S41 to S44), the extractor 106 extracts words other than the predetermined keywords from text data converted into text in step S33 (step S45). That is, the display controller 104 detects the aforementioned predetermined keywords and the extractor 106 extracts words other than the predetermined keywords in the fifth embodiment.

The display controller 104 detects words having detection counts equal to or greater than the predetermined third value from among the words extracted by the extractor 106 (step S46) and causes the display device 115 to display the detected words along with the detection counts thereof (step S47).

For example, when the third value is "15," for example, the display controller 104 may cause the display device 115 to display words that are words other than the predetermined keywords and have detection counts equal to or greater than the third value along with the detection counts thereof, as shown in FIG. 16.

According to the fifth embodiment, since words appearing many times are detected and displayed even if they are not the predetermined keywords in a conference or the like in a group, even if a user has initially not paid attention in the actual conference, a user can ascertain words focused upon and uttered by a person participating in the conference.

Meanwhile, the display controller 104 may cause the display device 115 to display the respective words detected in step S36 in a different display form from that of the keywords detected in step S34, as shown in an example of FIG. 17, for example (note in parenthesis in step S47 of FIG. 15).

Figure 18:
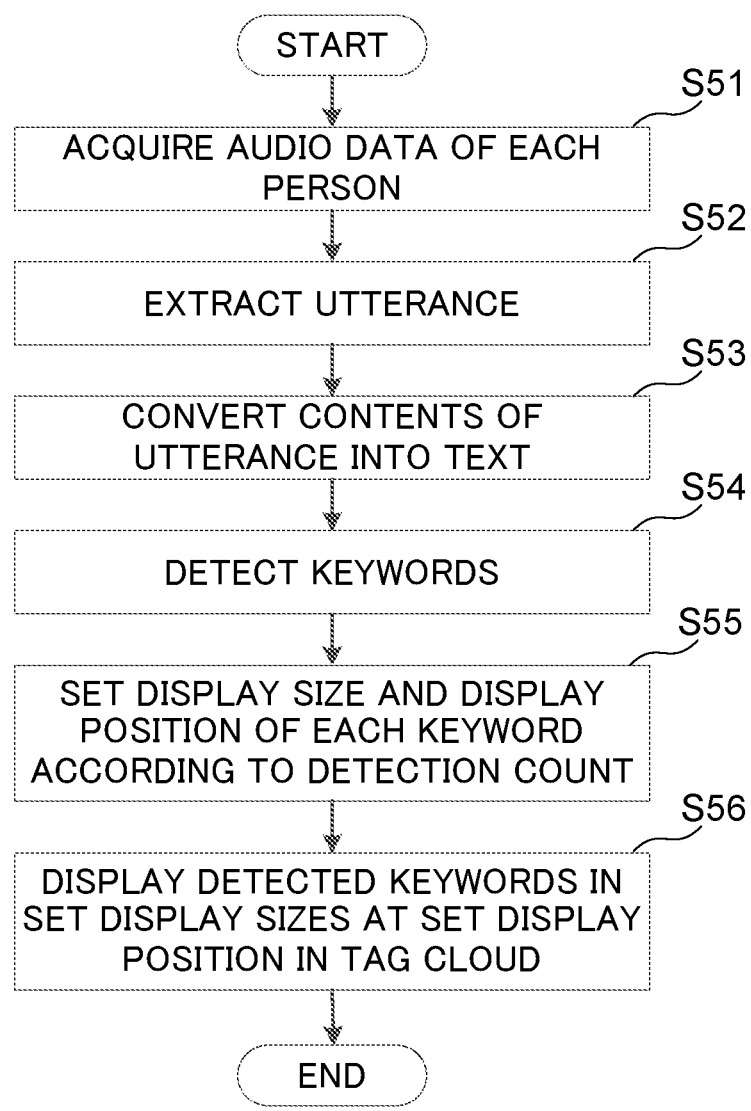
FIG. 18 is a flowchart showing speech analysis processing performed by the information processing apparatus according to a sixth embodiment.

Next, speech analysis processing performed by the information processing apparatus 1 according to a sixth embodiment will be described. FIG. 18 is a flowchart showing the speech analysis processing performed by the information processing apparatus 1 according to the sixth embodiment.

In the sixth embodiment, after processing until keyword detection like steps S1 to S4 in the first embodiment ends (steps S51 to S54), the display controller 104 counts detection counts of keywords detected by the second detector 103 for the respective keywords. Then, the display controller 104 determines images size when the keywords are displayed through the display device 115 according to the counted detection counts of the keywords (step S55). The display controller 104 increases an image size for a keyword having a larger detection count. Further, the display controller 104 determines image display positions when the keywords are displayed through the display device 115 according to the counted detection counts of the keywords (step S55). For example, the display controller 104 may set an image display position closer to the center in the vertical direction of the display screen of the display device 115 for a keyword having a larger detection count. Here, the display controller 104 sets different display positions in the display screen of the display device 115 for the respective keywords.

Figure 19:
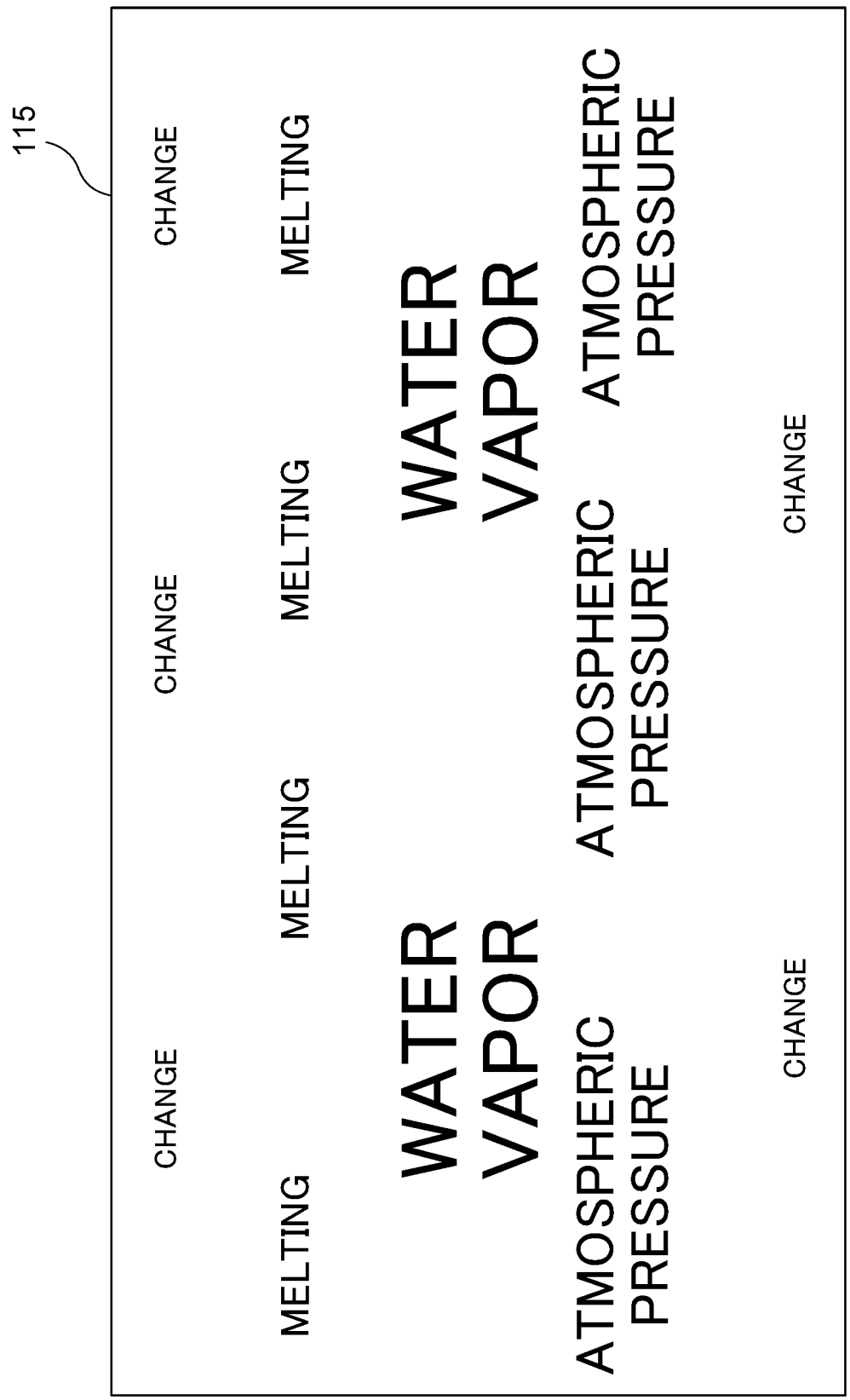
FIG. 19 is a diagram showing an example of a display screen of the display device.

In addition, when the keywords for which image sizes and display positions have been determined as described above are displayed through the display device 115, the display controller 104 displays the keywords in a tag cloud form, as shown in an example of FIG. 19 (step S56).

According to the sixth embodiment, a user can visually and intuitively ascertain a keyword having a largest appearance count.

Figure 20:
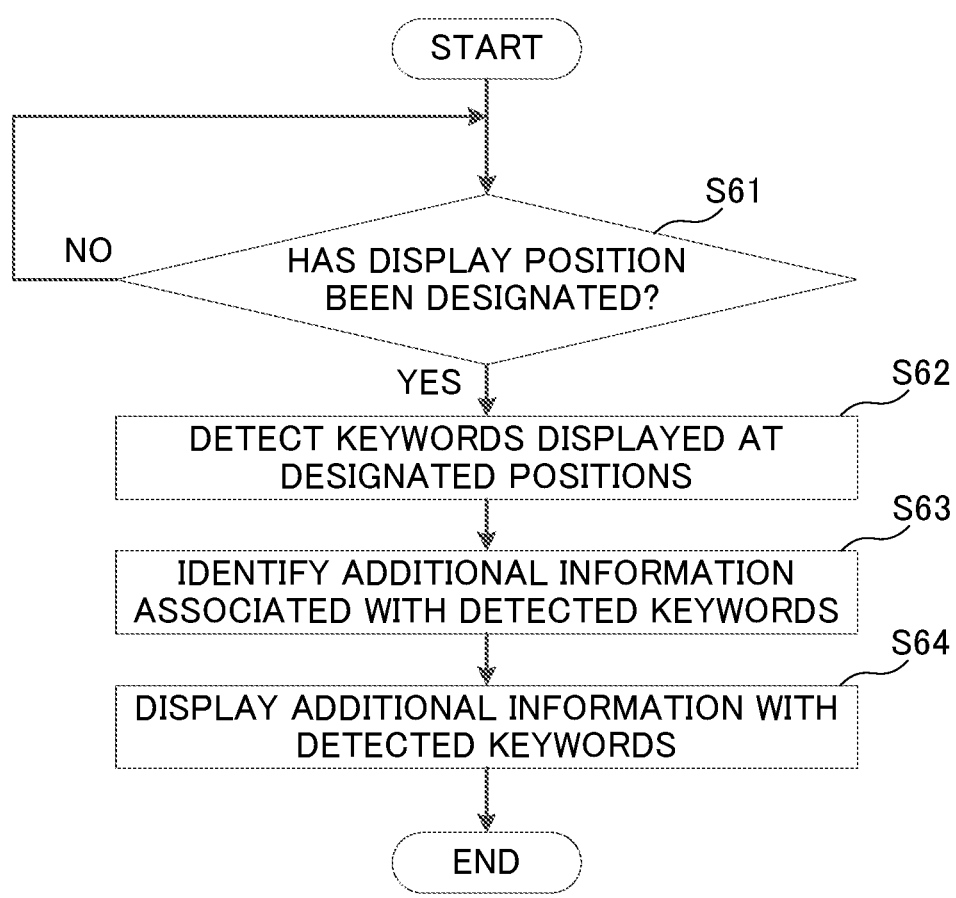
FIG. 20 is a flowchart showing processing of displaying additional information with respect to each keyword displayed through the display device.

Next, processing of displaying additional information with respect to respective keywords displayed through the display device 115 will be described. FIG. 20 is a flowchart showing processing of displaying additional information with respect to respective keywords displayed through the display device 115.

When the display controller 104 causes the display device 115 to display respective keywords or the aforementioned words in the tag cloud form in the sixth embodiment, the display controller 104 detects keywords displayed at positions designated by the input device 119 (step S62) when the positions on the display screen of the display device 115 have been designated by an operator operating the input device 119 including a mouse or the like (YES in step S61) and identifies additional information stored in the HDD 114 in association with the detected keywords (step S63). The display controller 104 additionally displays the identified additional information on the display screen of the display device 115 as shown in an example of FIG. 21 (step S64). Here, additional information may be information such as an appearance count of a keyword, an utterance time in a conference, and a speaker. Additional information is stored in the HDD 114.

According to the sixth embodiment, a user can visually recognize additional information with respect to displayed keywords through a simple operation.

In addition, the configurations and processing represented using FIG. 1 to FIG. 21 in the above-described embodiments are merely an embodiment of the present invention and the present invention is not limited thereto.

The invention claimed is:

1. An information processing apparatus comprising:
   a display device; and
   a control device that includes a processor and functions as, by the processor executing a speech analysis program:
      a first detector that detects, from audio data in which speech of each person in a group composed of a plurality of persons has been recorded, each utterance made during the speech;
      a textualization device that converts contents of each utterance detected by the first detector into text;
      a second detector that detects a predetermined keyword included in each utterance on the basis of text data obtained through textualization by the textualization device;
      a display controller that causes the display device to display the predetermined keyword detected by the second detector; and
      an extractor that extracts a word other than the predetermined keyword from the text data,
   wherein the display controller causes the display device to display a word having detection counts equal to or greater than a predetermined third value from among the word extracted by the extractor,
   wherein the display controller causes the display device to display the predetermined keyword and the word extracted by the extractor and having detection counts equal to or greater than the predetermined third value separately and to display the word in a different display form from a display form of the predetermined keywords.

2. The information processing apparatus according to claim 1, wherein the display controller causes the display device to display a keyword having detection counts equal to or greater than a predetermined first value from among the predetermined keyword detected by the second detector.

3. The information processing apparatus according to claim 1, further comprising a classifier that classifies the predetermined keyword detected by the second detector into a predetermined type,
   wherein the display controller causes the display device to display a type for which the sum of detection counts of respective keywords belonging to the type is equal to or greater than a predetermined second value and the keywords belonging to the type.

4. The information processing apparatus according to claim 1, wherein a plurality of keywords are provided as the predetermined keyword, predetermined points are set for each of the keywords each detection time, and the display controller sums the points according to the number of times of detection of each keyword and causes the display device to display each keyword along with the points.

5. The information processing apparatus according to claim 1, further comprising:
   an audio input device to which electronic signals representing speech are input; and a storage device that stores audio data based on the input electronic signals for each person who produces speech whenever the electronic signals are input to the audio input device,
    wherein the first detector extracts a part corresponding to an utterance from the audio data and detects the extracted part as an utterance.

6. The information processing apparatus according to claim 5, wherein the storage device further stores identification information for identifying the person in association with group information for identifying a group to which the person belongs,
    the control device further functions as a controller that stores the audio data in association with the identification information when the electronic signals are input to the audio input device, and
    the display controller causes the display device to display the predetermined keyword detected by the second detector for each group.

7. An information processing apparatus comprising:
a display device; and
a control device that includes a processor and functions as, by the processor executing a speech analysis program:
    a first detector that detects, from audio data in which speech of each person in a group composed of a plurality of persons has been recorded, each utterance made during the speech;
    a textualization device that converts contents of each utterance detected by the first detector into text;
    a second detector that detects a predetermined keyword included in each utterance on the basis of text data obtained through textualization by the textualization device; and
    a display controller that causes the display device to display the predetermined keyword detected by the second detector,
wherein the display controller causes the display device to display the detected keyword through visual representation using a tag cloud and to display the keyword such that a keyword is displayed larger as detection counts increase and a keyword having a largest detection count is displayed in a largest size,
the information processing apparatus further comprising:
an audio input device to which electronic signals representing speech are input;
a storage device that stores audio data based on the input electronic signals for each person who produces speech, whenever the electronic signals are input to the audio input device; and
a pointer that designates a position on the display screen of the display device,
wherein the first detector detects each time corresponding to the each utterance, and
the display controller further causes the display device to display a detection count, an utterance time, and a speaker, as additional information associated with a keyword displayed at the position designated by the pointer.

8. The information processing apparatus according to claim 7, wherein the display controller sets different display positions on a display screen of the display device for the respective predetermined keywords and causes the display device to display the respective predetermined keywords.

9. A speech analysis method, implemented by a computer, comprising executing on a processor steps of:
    detecting, from audio data in which speech of each person in a group composed of a plurality of persons has been recorded, each utterance made during the speech;
    converting contents of each detected utterance into text;
    detecting a predetermined keyword included in each utterance on the basis of text data obtained through textualization;
    causing a display device of the computer to display the predetermined keyword detected; and
    extracting a word other than the predetermined keyword from the text data,
wherein, the speech analysis method further comprising executing on the processor steps of:
causing the display device to display a word having detection counts equal to or greater than a predetermined third value from among the extracted word; and
causing the display device to display the predetermined keyword and the word extracted and having detection counts equal to or greater than the predetermined third value separately and to display the word in a different display form from a display form of the predetermined keyword.

* * * * *